June 14, 1927.

E. HORTON

PIN FASTENER

Filed May 1, 1925

1,632,338

INVENTOR
EDWIN HORTON
BY
Newell + Spencer
ATTORNEYS

Patented June 14, 1927.

1,632,338

UNITED STATES PATENT OFFICE.

EDWIN HORTON, OF BROOKLYN, NEW YORK.

PIN FASTENER.

Application filed May 1, 1925. Serial No. 27,171.

This invention relates to new and useful improvements in pin fasteners and it pertains more particularly to a locking means therefor.

While the invention is capable of use with pin fasteners commonly known as safety pins and of the general type, it is particularly adapted for use with blanket pins and is especially designed for use in connection with blanket pins when the same are employed to secure a blanket robe or the like to the robe rail of a vehicle.

It is one of the primary objects of the invention to provide means which may be attached to a pin fastener such as a safety pin when the pin fastener is in its closed position to prevent unauthorized opening thereof.

It is a further object of the invention to provide means for positively locking the pin fastener against operation when the pin fastener is closed.

With the above and other objects in view, the invention contemplates a member adapted for reception within the loop of a pin fastener of the safety pin type, which member, when retained in the loop, obstructs the path of movement of the pin member from closed to open position, thus preventing operation of the pin member to open the pin. The invention further contemplates suitable retaining means, preferably in the form of a lock, for preventing displacement of the member received within the loop relative thereto.

In the accompanying drawings forming a part of the specification—

Figure 1:
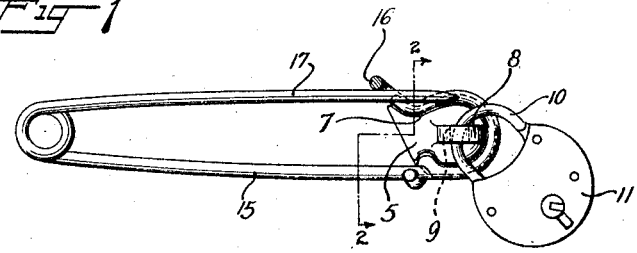
Figure 1 is a view in elevation of a pin fastener of the safety pin type showing a device constructed in accordance with the present invention, positioned in the loop of the pin.

Referring more specifically to the drawings, the invention comprises an abutment member in the form of a block adapted to be received in the loop of a pin fastener of the type employing a pin-receiving loop. The abutment member comprises a body portion 5 having its outer edge curved as designated at 7, to conform to the loop of the pin fastener, in connection with which the abutment member is to be used. The body portion 5 of the abutment member has one of its side edges defined by a flange 6, and projecting from its opposite side edge there is a lug 8. This lug 8 has a perforation 9 therein, which perforation is adapted to receive the shackle 10 of a padlock 11, as more clearly shown in Figures 1 and 2.

In the drawings, the reference numeral 15 designates the back of a pin fastener of the type employing a penetrating pin and a pin-receiving loop, the loop being designated by the reference numeral 16 and the penetrating pin being designated by the numeral 17.

In operation, the penetrating pin of the pin fastener is passed through the blanket or other article to which it is attached and it is then engaged with the loop 16 in the ordinary manner. After the pin fastener has been engaged with the blanket and closed, as heretofore stated, the abutment member is positioned in the loop of the pin fastener, as shown in Figure 1. With the abutment member in this position, the perforated lug 8 will project beyond the loop a sufficient distance to permit of the insertion into the perforation 9 thereof of the shackle 10 of a padlock, such as 11.

Figure 2:
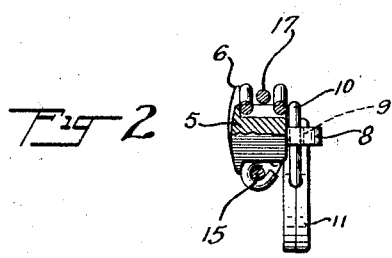
Figure 2 is a detail sectional view taken on the line 2—2 of Figure 1.
Figure 3:
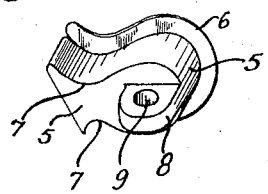
Figure 3 is a perspective view of the member received within the loop of the pin fastener and taken from one side thereof.
Figure 4:
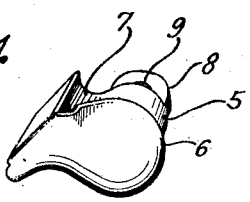
Figure 4 is a view similar to Figure 3, showing the opposite side of the member.

By reference to Figures 1 and 2, it will be noted that when the abutment member is placed within the loop 16 with the pin in its closed position, the abutment member will lie in the path of movement of the penetrating pin to open position, and will prevent movement of the pin in this direction, and consequently prevent opening of the pin.

When it is desired to open the pin, an authorized person, having a key to the lock 11, may open the same, removing its shackle from the perforation in the lug, after which the abutment member may be readily removed from the loop of the pin fastener, leaving the loop free for the movement of the penetrating pin to its open position.

While in the present instance the locking means is shown as a padlock, it is obvious that the locking means may be a part of the abutment member, without departing from the spirit of the invention. Furthermore the abutment member may be of any desired shape, so long as it will serve the function of passing into the loop of the pin fastener in connection with which it is used in such a manner as to prevent movement of the piercing pin thereof from closed to open position.

What is claimed is—

1. In a safety pin, the combination with a body portion, a penetrating member connected to one end thereof, and a loop member to receive the penetrating member and hold the pin closed, of a removable abutment member to prevent movement of the pin relative to its receiving loop and a lock to hold said abutment member in pin closing position.

2. In a safety pin, the combination with a body portion, having at one end a projecting pin portion and at the other end a loop adapted to receive said pin portion, of a removable block insertable within the loop and substantially filling the same to prevent removal of the pin, and means for locking the block within the loop.

3. The combination with a pin fastener of the type having a pin-receiving loop, of removable means receivable in and substantially filling the loop to prevent movement of the pin relative thereto, and means for locking the means received within the loop therein.

4. In a pin fastener of the type having a pin-receiving loop, a removable abutment member receivable within the pin-receiving loop to prevent movement of the pin relative to the loop, said abutment member comprising a body portion, a flange integral therewith for preventing displacement of the abutment member relative to the pin-receiving loop in one direction, and separate means for preventing displacement of the abutment member in the opposite direction.

5. In a pin fastener of the type having a pin-receiving loop, an abutment member receivable within the pin-receiving loop to prevent movement of the pin relative to the loop, said abutment member comprising a body portion, a flange integral therewith for preventing displacement of the abutment member relative to the pin-receiving loop in one direction, and separate means for preventing displacement of the abutment member in the opposite direction, said last mentioned means comprising a lock removably associated with the abutment member.

6. A locking means for pin fasteners of the type including a pin-receiving loop, said locking means including a removable rigid abutment member substantially filling and conforming to the inner contour of the pin-receiving loop to prevent removal of the pin therefrom, and means for retaining the abutment member in said pin-receiving loop.

Signed at New York city this 13th day of April, 1925.

EDWIN HORTON.